US012578000B2

(12) United States Patent
Lee et al.

(10) Patent No.: US 12,578,000 B2
(45) Date of Patent: Mar. 17, 2026

(54) HYDRAULIC-PNEUMATIC APPARATUS

(71) Applicant: SAMHONGSA CO., LTD., Seoul (KR)

(72) Inventors: Ki Cheol Lee, Incheon (KR); Jin Hyung An, Incheon (KR)

(73) Assignee: SAMHONGSA CO., LTD., Seoul (KR)

( * ) Notice: Subject to any disclaimer, the term of this patent is extended or adjusted under 35 U.S.C. 154(b) by 605 days.

(21) Appl. No.: 17/995,511

(22) PCT Filed: Apr. 5, 2021

(86) PCT No.: PCT/KR2021/004202
§ 371 (c)(1),
(2) Date: Oct. 5, 2022

(87) PCT Pub. No.: WO2021/206387
PCT Pub. Date: Oct. 14, 2021

(65) Prior Publication Data
US 2023/0175572 A1     Jun. 8, 2023

(30) Foreign Application Priority Data

Apr. 10, 2020     (KR) ........................ 10-2020-0044306

(51) Int. Cl.
| | |
|---|---|
| *F16F 9/06* | (2006.01) |
| *F16F 9/34* | (2006.01) |
| *F16F 9/36* | (2006.01) |

(52) U.S. Cl.
CPC ................ *F16F 9/061* (2013.01); *F16F 9/34* (2013.01); *F16F 9/369* (2013.01)

(58) Field of Classification Search
CPC .................................. F16F 9/061; F16F 9/369
See application file for complete search history.

(56) References Cited

U.S. PATENT DOCUMENTS 5,580,034 A * 12/1996 Cheng ..................... F16F 9/003
                                                                                  267/221
10,113,605 B2 10/2018 Cotter
(Continued)

FOREIGN PATENT DOCUMENTS

CN        104235251 A      12/2014
CN        205155001 U  *  4/2016
(Continued)

OTHER PUBLICATIONS

International Search Report for PCT/KR2021/004202 mailed Jul. 13, 2021, all pages.
(Continued)

*Primary Examiner* — Melody M Burch
(74) *Attorney, Agent, or Firm* — Kilpatrick Townsend & Stockton LLP

(57)     ABSTRACT

An aspect of the present disclosure provides a hydraulic-pneumatic apparatus including a cylinder assembly including a spindle with a hollow inside, a hollow cylinder portion, and a piston rod capable of reciprocating inside the hollow cylinder portion, and inserted through an inlet of the spindle, a flange portion surrounding the piston rod, disposed on an inlet side of the cylinder portion, and contacting an inner circumferential surface of the spindle, and a sealant disposed between the flange portion and one surface of the bent portion facing the flange portion, wherein a bent portion is formed on an inlet of the spindle to surround the flange portion.

8 Claims, 18 Drawing Sheets

(56)           References Cited

U.S. PATENT DOCUMENTS

| | | | |
|---|---|---|---|
| 11,592,070 | B2 | 2/2023 | Lee et al. |
| 2004/0061266 | A1 | 4/2004 | Riel et al. |
| 2018/0087595 | A1* | 3/2018 | Cotter ..................... F16F 9/432 |
| 2021/0041004 | A1 | 2/2021 | Lee et al. |

FOREIGN PATENT DOCUMENTS

| | | | | |
|---|---|---|---|---|
| CN | 106122341 | B * | 1/2019 | ............. F16F 9/061 |
| CN | 110050141 | A | 7/2019 | |
| CN | 110259754 | A | 9/2019 | |
| DE | 35 22 722 | A1 | 1/1987 | |
| DE | 102 44 671 | A1 | 4/2004 | |
| DE | 11 2019 001 321 | T5 | 12/2020 | |
| JP | 2002-242975 | A | 8/2002 | |
| JP | 5491952 | B2 | 5/2014 | |
| KR | 10-0837236 | B1 | 6/2008 | |
| KR | 10-2013-0078925 | A | 7/2013 | |
| KR | 10-2015-0110124 | A | 10/2015 | |
| KR | 10-2017887 | B1 | 9/2019 | |
| KR | 10-2019-0114225 | A | 10/2019 | |
| WO | 2019-190274 | A1 | 10/2019 | |

OTHER PUBLICATIONS

Office Action for Chinese Application No. 202180021393.2 mailed Feb. 21, 2025, 19 pages (with English translation).

* cited by examiner

FIG. 7

HYDRAULIC-PNEUMATIC APPARATUS

TECHNICAL FIELD

Embodiments of the present disclosure relate to hydraulic-pneumatic apparatuses such as a gas spring and a gas cylinder.

BACKGROUND ART

A gas cylinder or a gas spring is an apparatus capable of fixing a cylinder to a desired length or applying a force using hydraulic pressure. High pressure nitrogen (N2) gas is usually filled in the gas cylinder or the gas spring, and the flow of gas is controlled by opening and closing an orifice through a gas open pin or valve to adjust the overall length.

At this time, since the gas cylinder or the gas spring exhibits proper performance only when the pressure inside the cylinder is maintained constant, the gas cylinder or the gas spring has a sealing system including a plurality of O-rings to prevent the outflow of gas to the outside.

The background art of the present disclosure is disclosed in Korean Patent Application Laid-Open No. 10-2015-0110124 (published on Oct. 2, 2015, entitled with: gas cylinder).

The above-described background art is technical information possessed by the inventor for deriving the present disclosure or obtained during a process of deriving the present disclosure and is not necessarily a known technology disclosed to people prior to filing of the present disclosure.

DESCRIPTION OF EMBODIMENTS

Technical Problem

An object of embodiments of the present disclosure is to provide a hydraulic-pneumatic apparatus capable of preventing the outflow of a fluid accommodated therein by a sealant disposed between a flange portion and an inner circumferential surface of a spindle.

Solution to Problem

An aspect of the present disclosure provides a hydraulic-pneumatic apparatus including a cylinder assembly including a spindle with a hollow inside, a hollow cylinder portion, and a piston rod capable of reciprocating inside the hollow cylinder portion, and inserted through an inlet of the spindle, a flange portion surrounding the piston rod, disposed on an inlet side of the cylinder portion, and contacting an inner circumferential surface of the spindle, and a sealant disposed between the flange portion and one surface of the bent portion facing the flange portion, wherein a bent portion is formed at the inlet of the spindle to surround the flange portion.

The sealant may be in a liquid state, and then is cured.

A step portion having different diameters along a central axis of the piston rod in a longitudinal direction may be formed on the flange portion.

The sealant may be disposed on an inner circumferential surface of the bent portion.

The sealant may be disposed between an end of the bent portion facing the piston rod and an outer circumferential surface of the step portion formed on the flange portion.

The sealant may be disposed between the other side opposite to one side of the flange portion on which the step portion is formed and an inner circumferential surface of the bent portion.

In one surface of the flange portion, a first groove portion having a preset depth may be formed parallel to a central axis of the piston rod along an outer circumference of the piston rod, and the hydraulic-pneumatic apparatus may further include a first ring portion formed in a ring shape, and disposed in the first groove portion.

The first ring portion may be formed of a rubber material or a resin material.

A second groove portion having a preset depth may be formed in the flange portion along an outer circumferential surface facing an inner circumferential surface of the spindle, and the hydraulic-pneumatic apparatus may further include a second ring portion disposed in the second groove portion and contacting an inner circumferential surface of the spindle.

The second ring portion may be formed of a rubber material or a resin material.

The hydraulic-pneumatic apparatus may further include a gas sealing member surrounding the piston rod and disposed between the flange portion and the cylinder portion.

The hydraulic-pneumatic apparatus may further include an open holder surrounding the piston rod, disposed between the gas sealing member and the cylinder portion, and covering the cylinder portion.

The hydraulic-pneumatic apparatus may further include a support portion surrounding and combined with the piston rod and supporting a load of the piston rod.

The cylinder assembly may further include a pipe holder assembly including a valve disposed on the other side opposite to one side of the spindle on which the flange portion is disposed, combined with one end of the cylinder portion, and opening and closing a flow path of a fluid.

The hydraulic-pneumatic apparatus may further include a driving portion in contact with the valve, installed in the spindle, and transferring power to the valve to open and close the flow path of the fluid.

Another aspect of the present disclosure provides a hydraulic-pneumatic apparatus including a cylinder assembly including a spindle with a hollow inside, a hollow cylinder portion, and a piston rod capable of reciprocating inside the hollow cylinder portion, and inserted through an inlet of the spindle, a flange portion surrounding the piston rod, disposed on an inlet side of the cylinder portion, and contacting an inner circumferential surface of the spindle, and a first sealant disposed between the flange portion and one surface of the bent portion facing the flange portion, wherein a bent portion is formed at an inlet of the spindle to surround the flange portion, and a second sealant is frictionally applied to at least a part of an inner surface of the spindle to form a sealant film.

Another aspect of the present disclosure provides a hydraulic-pneumatic apparatus including an outer cylinder, an inner cylinder sharing a central axis with the outer cylinder and disposed inside the outer cylinder, a piston rod assembly including a piston rod capable of reciprocating inside the inner cylinder, and a piston valve installed on the piston rod, and providing a flow path of a fluid between the outer cylinder and the inner cylinder, a free piston partitioning a space between the outer cylinder and the inner cylinder, contacting each of an inner circumferential surface of the outer cylinder and an outer circumferential surface of the inner cylinder, and being movable, a flange portion surrounding the piston rod, disposed on an inlet side of the outer cylinder, and contacting the inner circumferential surface of the outer cylinder, and a sealant disposed between the flange portion and one surface of the bent portion facing the flange portion, wherein a bent portion is formed on at an inlet of the outer cylinder to surround the flange portion and.

The sealant may be in a liquid state, and then is cured.

A step portion having different diameters along a central axis of the piston rod in a longitudinal direction may be formed on the flange portion.

Another aspect of the present disclosure provides a hydraulic-pneumatic apparatus including a cylinder assembly including a spindle with a hollow inside, a hollow cylinder portion; and a piston rod capable of reciprocating inside the hollow cylinder portion, and inserted through an inlet of the spindle, a flange portion surrounding the piston rod, disposed on an inlet side of the cylinder portion, and contacting an inner circumferential surface of the spindle, and a sealant disposed between an inner circumferential surface of the spindle on which the protrusion portion is formed and an outer circumferential surface of the flange portion, wherein a protrusion portion is formed to protrude toward a central axis of the spindle in a longitudinal direction of the inlet of the spindle.

Other aspects, features and advantages other than those described above will become apparent from the following drawings, claims, and detailed description of the disclosure.

Advantageous Effects of Disclosure

Embodiments of the present disclosure may prevent the outflow of the fluid through a gap formed between the flange portion and the spindle due to the sealant disposed between the flange portion and the inner circumferential surface of the spindle.

The scope of the present disclosure is not limited by the effects.

BRIEF DESCRIPTION OF DRAWINGS

FIG. 7 is a front cross-sectional view illustrating a hydraulic-pneumatic apparatus in which a flange portion is installed according to another embodiment of the present disclosure.

BEST MODE

Figure 1:
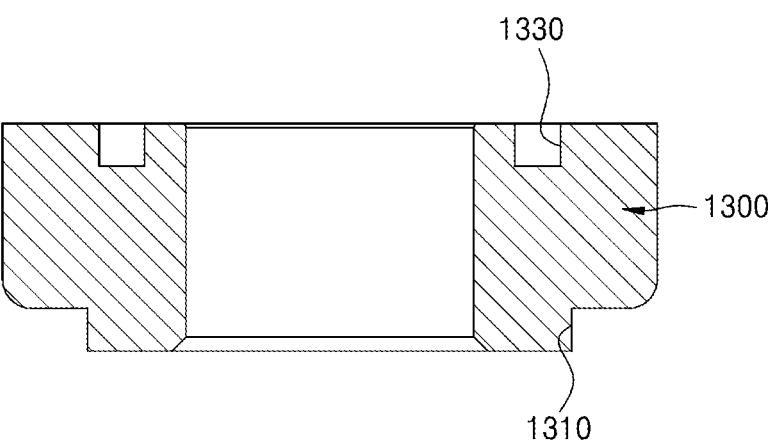
FIG. 1 is a front cross-sectional view illustrating a flange portion according to an embodiment of the present disclosure.

The present disclosure may apply various modifications and have various embodiments, and specific embodiments will be illustrated in the drawings and described in detail in the detailed description. Effects and features of the present disclosure, and a method of achieving the effects and features will be apparent with reference to the embodiments described below in detail together with the drawings. However, the present disclosure is not limited to the embodiments which will be described below and may be implemented in various forms.

Hereinafter, embodiments of the present disclosure will be described in detail with reference to the accompanying drawings, and when describing with reference to the drawings, the same or corresponding components are denoted by the same reference numerals, and redundant description thereof is omitted.

In the following embodiments, terms such as "first" and "second" are not used in a limiting meaning but used for the purpose of distinguishing one component from another component.

In the following embodiments, singular expressions include plural expressions unless the context clearly indicates otherwise.

In the following embodiments, a term such as "include" or "have" means that characteristics or components described in the specification are present, and do not preclude a possibility of adding one or more other characteristics or components.

In the following embodiments, when it is described that a portion such as a film, a region, or a component is on or over another portion, this includes not only a case in which the portion is directly on another portion, but also a case in which another film, region, component, etc. is disposed therebetween.

In the drawings, components may be exaggerated or reduced in size for the sake of convenient description. For example, a size and a thickness of each component illustrated in the drawings are randomly illustrated for the sake of convenient description, and thus the present disclosure is not limited to the illustration.

When a certain embodiment may be implemented differently, a specific process order may be performed differently from the order to be described. For example, two processes described in succession may be performed substantially simultaneously or may be performed in an order opposite to the described order.

In the following embodiments, when it is described that a film, a region, a component, etc. is connected, this includes not only a case in which the film, the region, the component, etc. is directly connected, but also a case in which the film, the region, the component, etc. is indirectly connected with another film, region, component, etc. disposed therebetween. For example, in the present specification, when it is described that a film, a region, a component, etc. is electrically connected, this includes not only a case in which the film, the region, the component, etc. is directly and electrically connected, but also a case in which the film, the region, the component, etc. is indirectly and electrically connected with another film, region, component, etc.

Figure 2:
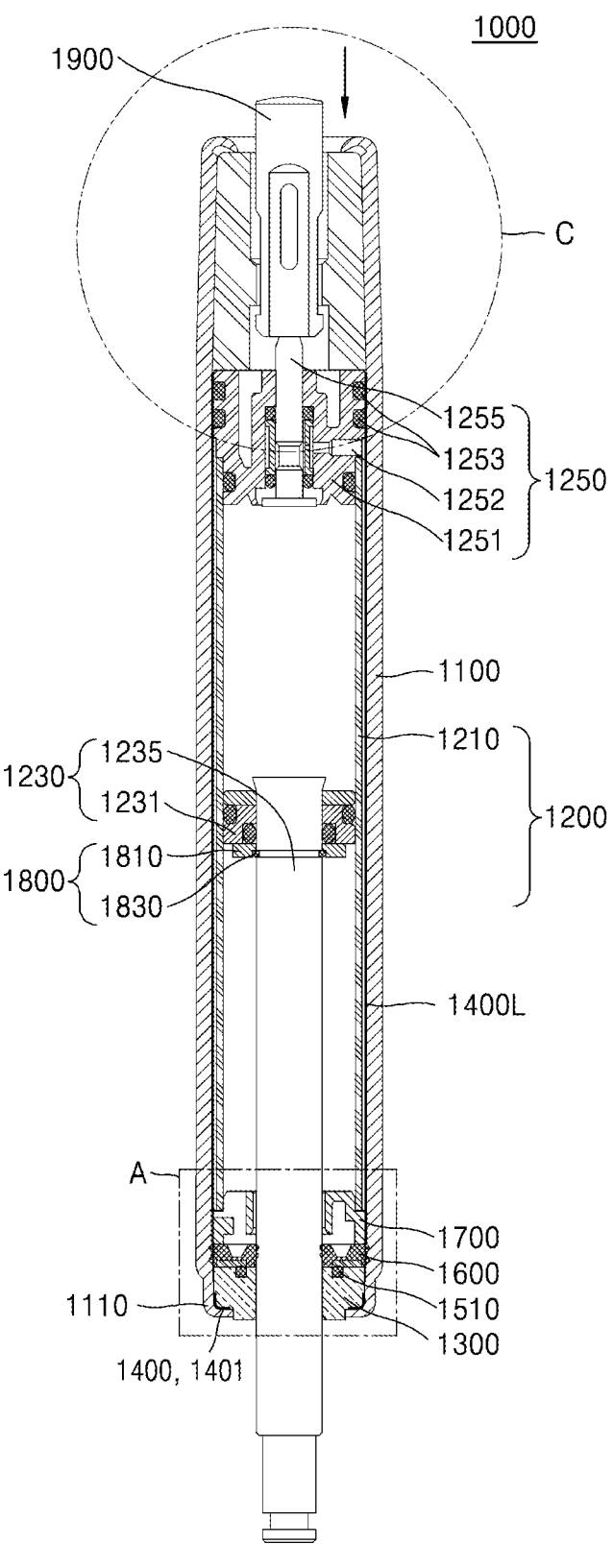
FIG. 2 is a front cross-sectional view illustrating a hydraulic-pneumatic apparatus in which a flange portion is installed according to an embodiment of the present disclosure.
Figure 3:
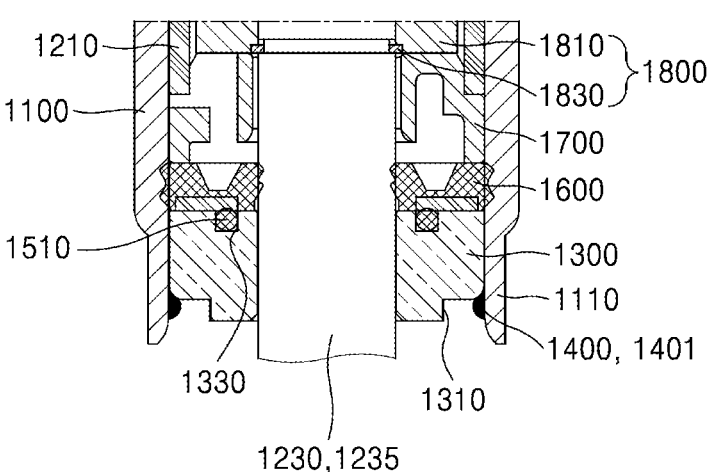
FIG. 3 is an enlarged view of part A of FIG. 2.
Figure 5:
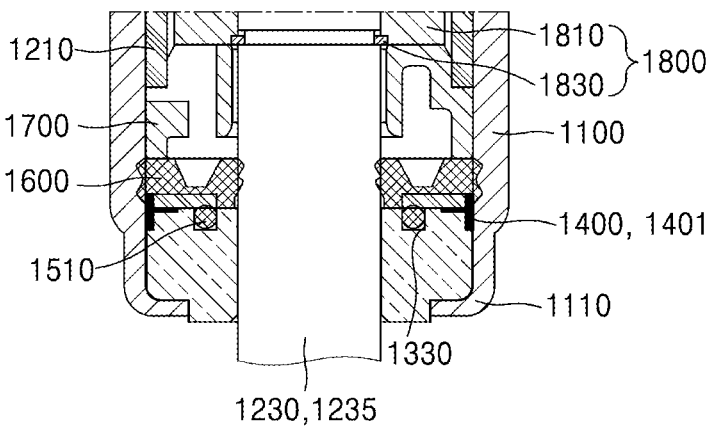
FIG. 5 is a view illustrating a sealant of which position is changed in the part A of FIG. 2.
Figure 6:
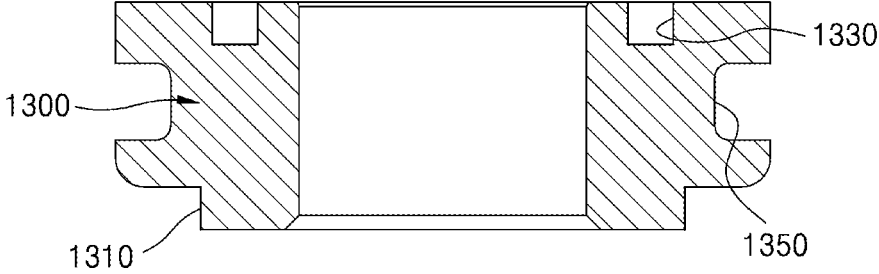
FIG. 6 is a front cross-sectional view illustrating a flange portion according to another embodiment of the present disclosure.
Figure 7:
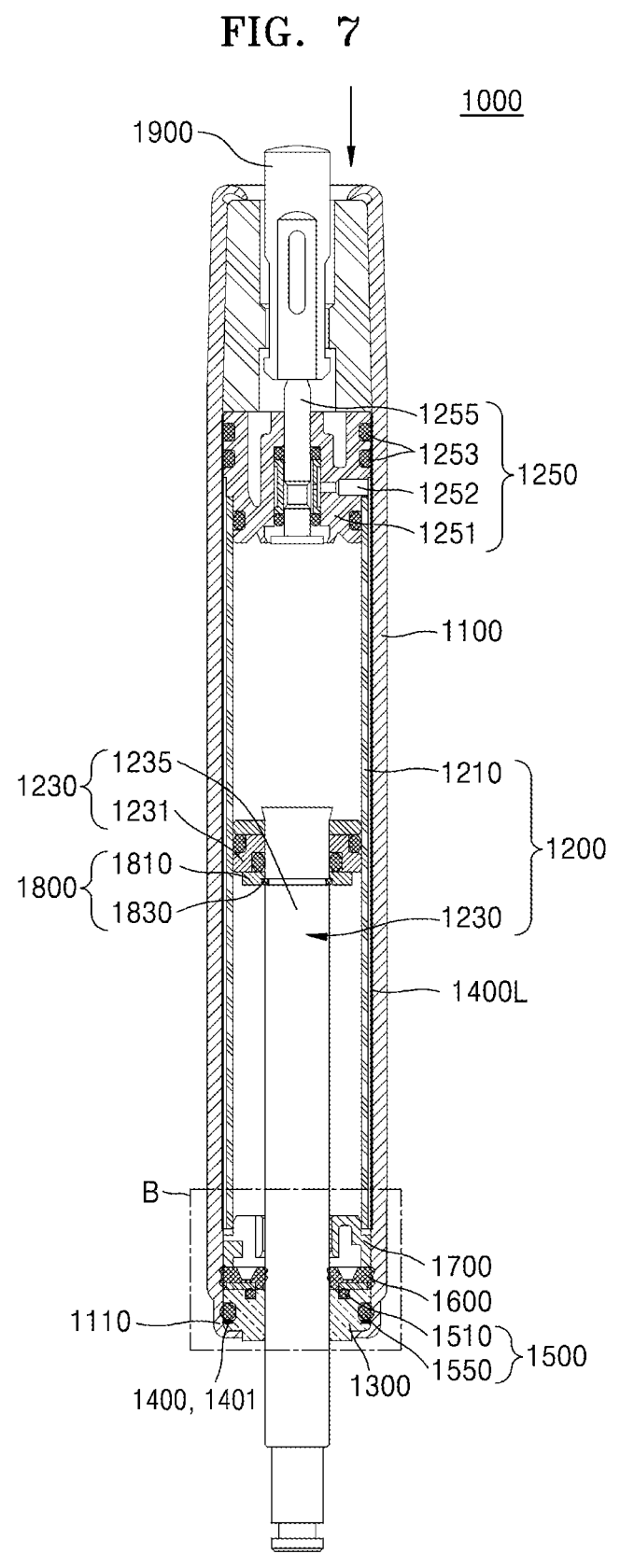
Figure 8A:
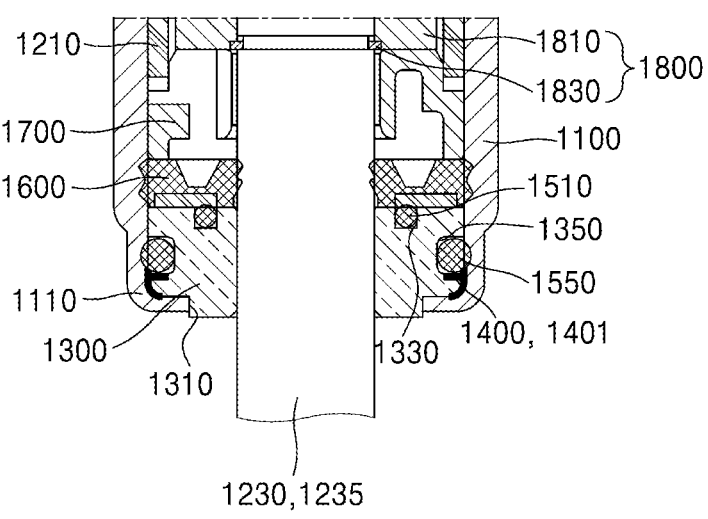
FIG. 8 is an enlarged view of part B of FIG. 7.
Figure 8B:
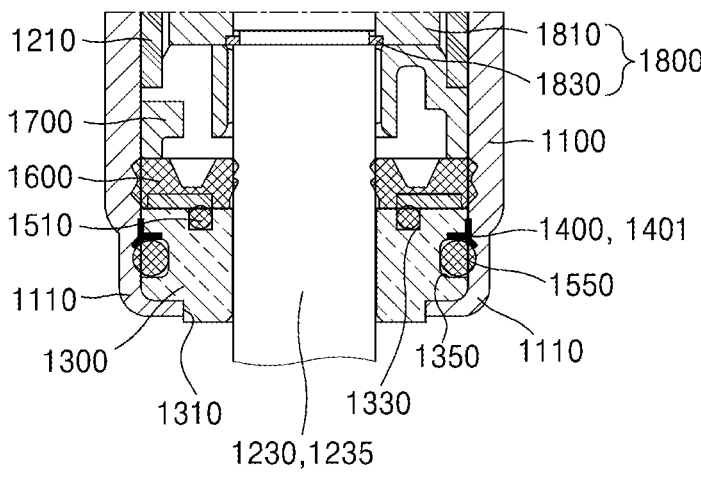
Figure 9:
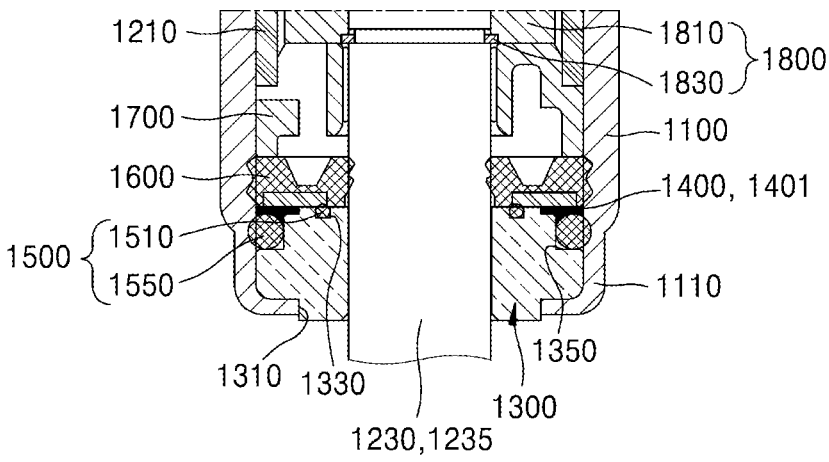
FIGS. 9A, 9B and 10 are views illustrating a sealant of which position is changed in the part B of FIG. 7.
Figure 10:
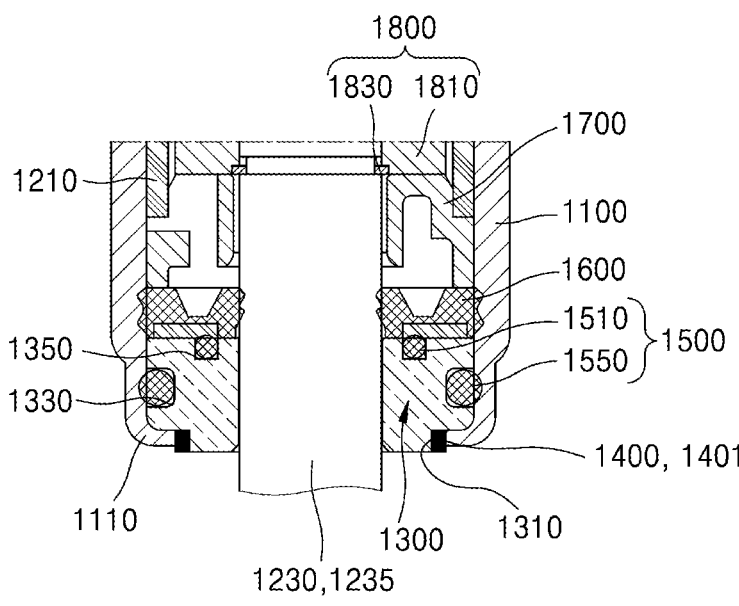
Figure 11:
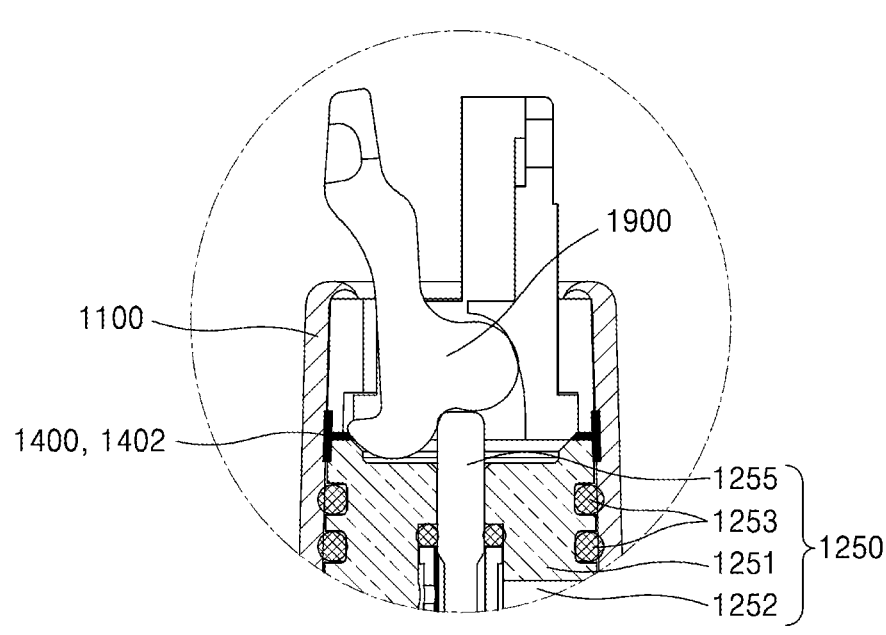
FIG. 11 is a view illustrating a driving portion according to another embodiment in a part C of FIG. 2.

First, a hydraulic-pneumatic apparatus according to an embodiment of the present disclosure will be described. FIG. 1 is a front cross-sectional view illustrating a flange portion according to an embodiment of the present disclosure. FIG. 2 is a front cross-sectional view illustrating a hydraulic-pneumatic apparatus in which a flange portion is installed according to an embodiment of the present disclosure. FIG. 3 is an enlarged view of part A of FIG. 2. FIG. 5 is a view illustrating a sealant of which position is changed in the part A of FIG. 2. FIG. 6 is a front cross-sectional view illustrating a flange portion according to another embodiment of the present disclosure. FIG. 7 is a front cross-sectional view illustrating a hydraulic-pneumatic apparatus in which a flange portion is installed according to another embodiment of the present disclosure. FIG. 8 is an enlarged view of part B of FIG. 7. FIGS. 9A, 9B and 10 are views illustrating a sealant of which position is changed in the part B of FIG. 7. FIG. 11 is a view illustrating a driving portion according to another embodiment in a part C of FIG. 2.

A flange portion 1300 according to embodiments of the present disclosure includes two embodiments depending on the presence or absence of a second groove portion 1350 which will be described below. A hydraulic-pneumatic apparatus 1000 including the flange portion 1300 according to a first embodiment will be described with reference to FIGS. 1 to 5 and 11, and the hydraulic-pneumatic apparatus 1000 including the flange portion 1300 according to a second embodiment will be described with reference to FIGS. 6 to 10.

<Hydraulic-Pneumatic Apparatus Including Flange Portion According to the First Embodiment>

Referring to FIGS. 1 to 5, the hydraulic-pneumatic apparatus 1000 may include a spindle 1100, a cylinder assembly 1200, the flange portion 1300, a sealant 1400, a first ring portion 1510, a gas sealing member 1600, an open holder 1700, a support portion 1800, and a driving portion 1900.

Referring to FIGS. 2 to 5, the spindle 1100 according to an embodiment of the present disclosure forms the exterior of the hydraulic-pneumatic apparatus 1000. Both sides (upper and lower sides with reference to FIG. 2) of the spindle 1100 are opened with respect to the central axis in the longitudinal direction, and the cylinder assembly 1200 which will be described below may be inserted into the spindle 1100.

Referring to FIG. 2, the cylinder assembly 1200 may be inserted through one side (the lower side with reference to FIG. 2) of the spindle 1100 according to an embodiment of the present disclosure. A pipe holder assembly 1250 and the driving portion 1900 which will be described below may be disposed on the other side (the upper side with reference to FIG. 2) opposite to one side (the lower side with reference to FIG. 2) of the spindle 1100 into which the cylinder assembly 1200 is inserted.

Referring to FIG. 2, sealants 1400 and 1401 may be disposed in a preset region on an inner circumferential surface of the spindle 1100 according to an embodiment of the present disclosure.

Specifically, a sealant film 1400L may be formed by applying the sealants 1400 and 1401 to the preset region on the inner circumferential surface of the spindle 1100 facing the cylinder assembly 1200, inserting the pipe holder assembly 1250 which will be described below into the spindle 1100, and frictionally applying the sealant 1400.

In the present disclosure, the sealants 1400, 1401, and 1402 may be anaerobic resin that is in a liquid, semi-liquid, or solid state and then is solidified, that is, cured, when air is blocked. The sealants 1400, 1401, and 1402 may include, for example, a polyester-based resin material such as methacrylate ester or a fluororesin material such as polytetrafluoroethylene (PTFE), but the present disclosure is not limited thereto.

The sealant 1400 forming the sealant film 1400L may be applied at a preset distance away from an inlet of the spindle 1100, and, specifically, may be applied at a distance of 5 mm to 10 mm.

The sealant 1400 of about 1 cc to about 3 cc forming the sealant film 1400L may be applied in the hydraulic-pneumatic apparatus 1000 according to an embodiment of the present disclosure, but is not limited thereto, and various modifications are possible in consideration of design conditions such as the length of the spindle 1100.

The sealant film 1400L may be cured through a curing process under anaerobic conditions. The curing process may be performed at room temperature for about 24 hours, but the present disclosure is not limited thereto. The sealant 1400 forming the sealant film 1400L will be described in detail below.

Referring to FIGS. 2 to 5, the flange portion 1300, which will be described below, may be disposed inside the inlet of the spindle 1100 according to an embodiment of the present disclosure, and a bent portion 1110 that surrounds the flange portion 1300 and is bent may be formed in the inlet of the spindle 1100.

In the present specification, the 'bent portion 1110' is a portion corresponding to a preset section on the inlet side of the spindle 1100, and may include both a region surrounding a lower end portion (with reference to FIG. 2) of the flange portion 1300 and having an inner circumferential surface formed in a curved shape and a part contacting the outer circumferential surface of the flange portion 1300 and formed in a cylindrical shape.

Referring to FIGS. 2 to 5, the cylinder assembly 1200, the gas sealing member 1600, the open holder 1700, and the flange portion 1300, which will be described below, may be inserted into the inside of the spindle 1100, and the bent portion 1110 formed on the inlet side of the spindle 1100 may surround the flange portion 1300 and be curled.

The bent portion 1110 is formed on the spindle 1100 and surrounds the flange portion 1300, so that the inner circumferential surface of the spindle 1100 may closely contact the flange portion 1300, thereby preventing the flange portion 1300 from being separated from the inside of the spindle 1100.

Referring to FIG. 2, the cylinder assembly 1200 according to an embodiment of the present disclosure shares a central axis with the spindle 1100 in a longitudinal direction and is inserted into the spindle 1100, and may include a cylinder portion 1210, a piston rod 1230, and a pipe holder assembly 1250.

Referring to FIG. 2, the cylinder portion 1210 according to an embodiment of the present disclosure is formed in a hollow tubular shape, and may provide space for filling a fluid formed of compressed gas such as nitrogen therein.

The piston rod 1230 according to an embodiment of the present disclosure reciprocates by hydraulic pressure in the cylinder portion 1210, and may move up and down direction with reference to FIG. 2.

The piston rod 1230 may be disposed along the central axis of the cylinder portion 1210 in the longitudinal direction, and may include a piston head 1231 and a rod body 1235.

Referring to FIG. 2, the rod body 1235 is formed to extend in the longitudinal direction (up and down direction with reference to FIG. 2), and may share the central axis with the spindle 1100 and the cylinder portion 1210.

Referring to FIG. 2, the piston head 1231 is combined with one end (the upper end with reference to FIG. 2) of the rod body 1235, may closely contact the inner circumferential surface of the cylinder portion 1210, and may partition the inner space of the cylinder portion 1210.

Referring to FIG. 2, the flange portion 1300, the gas sealing member 1600, the open holder 1700, and the support portion 1800, which will be described below, may be disposed on the piston rod 1230 according to an embodiment of the present disclosure, specifically, on the outside of the rod body 1235, which will be described in detail below.

The pipe holder assembly 1250 according to an embodiment of the present disclosure is disposed on the other side (the upper side with reference to FIG. 2) opposite to one side (the lower side with reference to FIG. 2) of the spindle 1100 on which the flange portion 1300 is disposed, and may be combined with one end (the upper end with reference to FIG. 2) of the cylinder portion 1210.

Referring to FIG. 2, the pipe holder assembly 1250 according to an embodiment of the present disclosure may include a pipe holder body 1251, an O-ring 1253, and a valve 1255. The pipe holder body 1251 may cover one end (the upper side with reference to FIG. 2) of the cylinder portion 1210, and may seal the fluid inside the cylinder portion 1210.

The pipe holder body 1251 and the O-ring 1253 may be formed to further protrude than the cylinder portion 1210 in a radial direction.

Referring to FIG. 2, a gap may be formed between the outer circumferential surface of the cylinder portion 1210 and the inner circumferential surface of the spindle 1100, the fluid may flow through the gap, the piston rod 1230 may reciprocate in the cylinder portion 1210, and the stroke of the hydraulic-pneumatic apparatus 1000 may be adjusted.

In the pipe holder body 1251 according to an embodiment of the present disclosure, a flow path of the fluid may be formed, and the valve 1255 opening and closing the flow path of the fluid may be installed. The valve 1255 is movable on the pipe holder body 1251 by receiving power from the driving portion 1900 which will be described below.

Consequently, when a user applies pressure to the driving portion 1900, the driving portion 1900 presses the valve 1255, and the position of the valve 1255 is changed, thereby opening and closing an orifice 1252 which is a flow path formed in the pipe holder body 1251.

Referring to FIG. 2, the width of the pipe holder assembly 1250 according to an embodiment of the present disclosure, specifically, the pipe holder body 1251, may be the same as the width (diameter) of the inner circumferential surface of the spindle 1100. Consequently, the pipe holder body 1251 comes into contact with the inner circumferential surface of the spindle 1100.

Furthermore, the cylinder portion 1210 formed to be smaller than the width of the pipe holder assembly 1250, specifically, the pipe holder body 1251, may be inserted in a state of being spaced apart from the inner circumferential surface of the spindle 1100, and a gap between such a cylinder portion the 1210 and the inner circumferential surface of the spindle 1100 may provide a passage through which a fluid such as gas may flow when the hydraulic-pneumatic apparatus 1000 operates later.

Furthermore, because the pipe holder assembly 1250 contacts the inner circumferential surface of the spindle 1100, when the cylinder assembly 1200 is inserted into the spindle 1100, the cylinder assembly 1200 may frictionally push the the sealant 1400 applied to the inner circumferential surface of the spindle 1100.

That is, the sealant 1400 is frictionally applied to the inner circumferential surface of the spindle 1100 by the cylinder assembly 1200, specifically, the pipe holder assembly 1250, thereby forming the sealant film 1400L of a cylindrical shape.

Other components constituting the pipe holder assembly 1250 are widely known techniques, and thus detailed descriptions thereof will be omitted.

Referring to FIGS. 1 to 5, the flange portion 1300 according to the first embodiment of the present disclosure surrounds the piston rod 1230, specifically, the rod body 1235, may be disposed on the inlet side of the cylinder portion 1210, and may contact the inner circumferential surface of the spindle 1100.

The gas sealing member 1600 and the open holder 1700, which will be described below, may be disposed between the flange portion 1300 and the cylinder portion 1210, and the flange portion 1300 may be directly or indirectly combined with the inlet of the cylinder portion 1210.

Referring to FIGS. 1 and 2, a step portion 1310 may be formed on one side (the lower side with reference to FIG. 1) of the flange portion 1300 to have different diameters along the axis in the longitudinal direction. Consequently, when the spindle 1100 surrounds one side (the lower side with reference to FIG. 1) of the flange portion 1300 and is curled, the lower end (with reference to FIG. 2) of the spindle 1100 may be disposed to face the step portion 1310.

As with the flange portion 1300 according to a second embodiment which will be described below, referring to FIG. 10, the sealants 1400 and 1401 may be applied along the circumference in a ring shape between one end of the spindle 1100 facing the step portion 1310, thereby preventing the outflow of the fluid between the spindle 1100 and the flange portion 1300.

FIG. 10 shows that the sealants 1400 and 1401 are applied between the step portion 1310 formed in the flange portion 1300 according to the second embodiment and an end of the spindle 1100, but the present disclosure is not limited thereto, and various modifications are possible, such as the sealants 1400 and 1401 applied between the step portion 1310 formed on the flange portion 1300 according to the first embodiment and the end of the spindle 1100.

Referring to FIGS. 1 to 5, a first groove portion 1330 having a preset depth and being parallel to the central axis of the piston rod 1230 along the outer circumference of the piston rod 1230 may be formed in one surface (the upper surface with reference to FIG. 1) of the flange portion 1300 according to the first embodiment of the present disclosure.

Specifically, the first groove portion 1330 is formed in one surface (the upper surface with reference to FIG. 2) of the flange portion 1300 facing the inlet side of the cylinder portion 1210, and may be formed as a groove portion in a ring shape with reference to the center of the flange portion 1300 into which the piston rod 1230 is inserted.

A first ring portion 1510 may be disposed on the first groove portion 1330 formed in one surface (the upper surface with reference to FIG. 1) of the flange portion 1300, and the diameter of the first ring portion 1510 may be formed to be relatively larger than the depth of the first groove portion 1330.

Consequently, the first ring portion 1510 may protrude from one surface of the flange portion 1300 in which the first groove portion 1330 is formed while seated in the first groove portion 1330.

The first ring portion 1510 is formed in a ring shape, may be formed of the same material as that of the O-ring 1253, and may be formed of an elastically deformable rubber material, a resin material, an acrylonitrile-butadiene rubber (ABR) material, a metal material, etc. The first ring portion 1510 may prevent the outflow of the fluid between the flange portion 1300 and the gas sealing member 1600.

Referring to FIGS. 2 to 5, the sealants 1400 and 1401 according to an embodiment of the present disclosure may be disposed between the flange portion 1300 and the spindle 1100 facing the flange portion 1300, specifically, one surface of the bent portion 1110.

The sealants 1400 and 1401 according to an embodiment of the present disclosure are in a liquid state and then are cured, and may block the flow path of the fluid between the spindle 1100 and the flange portion 1300 to prevent the outflow of the fluid.

Referring to FIG. 3, the sealants 1400 and 1401 according to an embodiment of the present disclosure may be disposed on the spindle 1100, specifically, the inner circumferential surface of the bent portion 1110.

Referring to FIG. 3, the sealants 1400 and 1401 may be disposed on the outside of the flange portion 1300 after the cylinder assembly 1200, the open holder 1700, the gas sealing member 1600, and the flange portion 1300 are inserted into the spindle 1100. In this regard, the sealants 1400 and 1401 may simultaneously contact the spindle 1100, specifically, the inner circumferential surface of the bent portion 1110, and the flange portion 1300.

Referring to FIG. 2, the sealants 1400 and 1401 are disposed on the inner circumferential surface of the bent portion 1110, and simultaneously contacts the flange portion 1300, thereby blocking the outflow of the fluid through the space formed between the flange portion 1300 and the spindle 1100.

FIG. 3 shows that the bent portion 1110 formed on the inlet side of the spindle 1100 is not yet bent, wherein the sealants 1400 and 1401 are disposed on the inner circumferential surface of the bent portion 1110 so as to contact the flange portion 1300. Referring to FIG. 2, the spindle 1100, specifically, the inner circumferential surface of the bent portion 1110, may be curled to surround the flange portion 1300, and the sealants 1400 and 1401 may be disposed between the inner circumferential surface of the bent portion 1110 and the flange portion 1300. The sealants 1400 and 1401 are cured, thereby preventing the outflow of the fluid between the flange portion 1300 and the spindle 1100.

Referring to FIG. 2, the spindle 1100, specifically, an outer end of the bent portion 1110, may contact the step portion 1310 formed in the flange portion 1300. Accordingly, in addition to blocking the outflow of fluid between the inner circumferential surface of the bent portion 1110 and the flange portion 1300, the end of the bent portion 1110 closely contacts the flange portion 1300, thereby additionally blocking the outflow of fluid.

Figure 4:
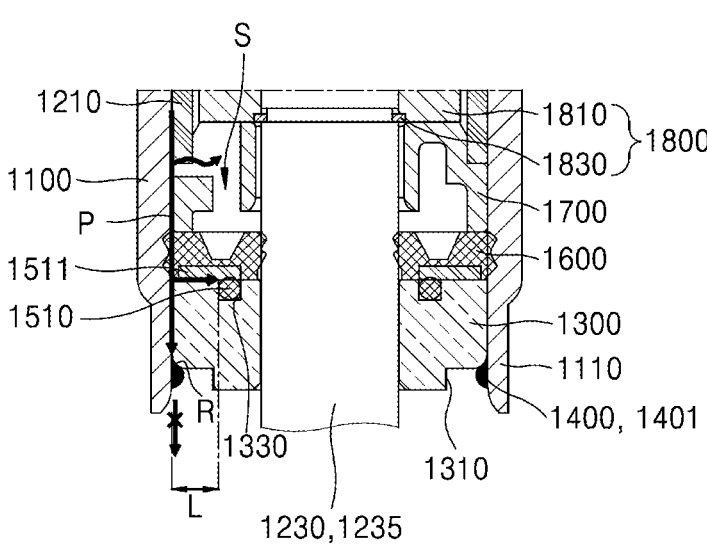
FIG. 4 is a view specifically illustrating components of FIG. 3.

Referring to FIG. 4, the sealants 1400 and 1401 may be disposed between the flange portion 1300 and the spindle 1100 so to be spaced apart from the gas sealing member 1600. When gas is injected into the hydraulic-pneumatic apparatus, high pressure gas is injected between the piston rod and the flange portion. The gas sealing member may be pressurized by the injected high pressure gas.

At this time, the gas sealing member formed of rubber may be deformed by a gas nozzle that injects the high pressure gas and the high pressure gas, and when the sealant is disposed in contact with the gas sealing member, a pressure may be applied to the sealant in contact with the gas sealing member which is deformed, so that the sealant may be disturbed or deformed.

When the sealant is disturbed or deformed, because the sealing force through the sealant is decreased, the quality of the hydraulic-pneumatic apparatus may be deteriorated. Accordingly, the sealants 1400 and 1401 according to an embodiment of the present disclosure may be disposed to be spaced apart from the gas sealing member 1600.

At this time, the sealants 1400 and 1401 are disposed between the inner circumferential surface of the bent portion 1110 and the flange portion 1300. the arrangement of the sealants 1400 and 1401 may be completed, by applying the sealant between the inner circumferential surface of the bent portion 1110 and the flange portion 1300 facing the outside before the bending portion 1110 is bent, and bending the bending portion 1110 after curing the sealant, and thus, an arrangement process of the sealants 1400 and 1401 may be simplified compared to a case in which the sealants 1400 and 1401 are disposed inside the flange portion 1300. In addition, the sealants 1400 and 1401 are automatically applied along the circumference between the flange portion 1300 and the bent portion 1110 by rotation of the hydraulic-pneumatic apparatus, only by rotating the hydraulic-pneumatic apparatus around the piston rods 1230 and 1235 and simultaneously discharging the sealant from a fixed sealant discharging apparatus, and thus, an application process itself of the sealants 1400 and 1401 may also be simplified, and the precision of the application process may be improved.

Referring to FIG. 4, a metal material 1511 may be disposed on an upper portion of the first ring portion 1510. The metal material 1511 may be disposed to cover the first groove portion 1330 in which the first ring portion 1510 is accommodated. The metal material 1151 covers the first groove portion 1330, and thus the first ring portion 1510 may be fixed to the inside of the first groove portion 1330. Also, the first ring portion 1510 may be disposed to be spaced apart from the gas sealing member 1600 through the metal material 1151.

The gas sealing member 1600 may be formed of a rubber material. For example, the gas sealing member 1600 may include nitrile-butadiene rubber (NBR). In addition to the gas sealing member 1600, the first ring portion 1510 may also be formed of a rubber material, and may include, for example, NBR.

That is, when the gas sealing member 1600 and the first ring portion 1510 are disposed to contact each other, the gas sealing member 1600 formed of a flexible rubber material may not completely cover the first groove portion 1330, and at least a part of the first ring portion 1510 is separated to the outside of the first groove portion 1330 through a part of the first ring portion 1510 contacting the gas sealing member 1600, and thus, the sealing force of the first ring portion 1510 may be reduced.

Accordingly, the metal material 1511 having a hard physical property according to an embodiment of the present disclosure is disposed to cover the first groove portion 1330, and thus, the first ring portion 1510 may be fixed within the first groove portion 1330, and the sealing force of the first ring portion 1510 may be maintained at a certain level. The metal material 1151 may be formed as a cold rolled steel sheet. Through the cold rolled steel sheet, the rigidity of the metal material may be secured, the position of the first ring portion 1510 may be fixed, and a function of sealing a leaking gas may be performed.

Referring to FIG. 4, the first groove portion 1330 and the first ring portion 1510 may be disposed at the right end of the metal material 1511. That is, gas flowing in a movement path P may leak into a part between the flange portion 1300 and the metal material 1511, and at this time, the leaked gas passes through a flow space L between the metal material 1511 and the flange portion 1300 and meets the first ring portion 1510 in a low hydraulic pressure state, and thus, the sealing force through the first ring portion 1510 may be improved. This may be applied in the same way as the principle of maximally securing a vertical flow space of the leaking gas by the sealants 1400 and 1401 being disposed at the lower end of the flange portion 1300.

The sealants 1400 and 1401 may be disposed on a round corner part R of the flange portion 1330. The corner part of the flange portion 1330 is formed to be round R, and thus, the sealants 1400 and 1401 in the liquid state may be easily applied to the space between the corner part of the flange portion 1330 and the inner circumferential surface of the bent portion 1110, even after cured, the sealants 1400 and 1401 are cured in a shape having a certain depth from the round part of the flange portion 1330 to a part where the inner circumferential surface of the flange portion 1330 contacts the bent portion 1110, and thus the sealing force of the sealants 1400 and 1401 may be improved.

Referring to FIG. 5, the sealants 1400 and 1401 according to an embodiment of the present disclosure may be disposed between the other side (the upper side with reference to FIG. 5) opposite to one side (the lower side with reference to FIG. 5) of the flange portion 1300 in which the step portion 1310 is formed and the inner circumferential surface of the bent portion 1110. The sealants 1400 and 1401 are disposed between the upper side (with reference to FIG. 5) of the flange portion 1300 and the spindle 1100, specifically, the inner circumferential surface of the bent portion 1110, so that the sealants 1400 and 1401 may simultaneously contact the gas sealing member 1600, the flange portion 1300, and the spindle 1100.

The sealants 1400 and 1401 are cured, and therefore, a gap that may be formed between the flange portion 1300, the spindle 1100, and the gas sealing member 1600 is filled, thereby blocking the outflow of the fluid through the gap.

Referring to FIGS. 2 to 5, the gas sealing member 1600 according to an embodiment of the present disclosure surround the piston rod 1230, specifically, the rod body 1235, and may be disposed between the flange portion 1300 and the cylinder portion 1210. The gas sealing member 1600 serves to block the entry and exit of a fluid such as gas inside and outside the spindle 1100.

A hole (with no reference numeral) is formed in the central portion of the gas sealing member 1600, and the piston rod 1230, specifically, the rod body 1235, may pass, and thus the piston rod 1230 may reciprocate through the hole. Although not shown in the drawings, a sealant may be applied to one surface (the lower surface with reference to FIG. 2) of the gas sealing member 1600 facing the flange portion 1300.

Referring to FIGS. 2 to 5, the open holder 1700 according to an embodiment of the present disclosure surrounds the piston rod 1230, specifically, the rod body 1235, and is disposed between the gas sealing member 1600 and the cylinder portion 1210, and may cover an open region of the cylinder portion 1210.

A hole (with no reference numeral) is formed in the central portion of the open holder 1700 according to an embodiment of the present disclosure, and the piston rod 1230 may pass, and thus, the piston rod 1230 may reciprocate through the hole. The open holder 1700 may fix the position of the cylinder portion 1210 to the inside of the spindle 1100, and provide a reciprocating path of the piston rod 1230. The above-described sealing material film 1400L may be formed up to a boundary between the open holder 1700 and the cylinder portion 1210.

Although not shown in the drawings, a sealant may be disposed between one surface (the lower surface with reference to FIG. 2) of the open holder 1700 and the inner circumferential surface of the cylinder portion 1210, thereby preventing the outflow of the fluid such as gas between the open holder 1700 and the inner circumferential surface of the cylinder portion 1210.

Referring to FIGS. 2 to 5, the support portion 1800 according to an embodiment of the present disclosure surrounds and is combined with the piston rod 1230, and supports the load on the axis in the longitudinal direction (up and down direction with reference to FIG. 2) of the piston rod 1230, and may include a washer portion 1810 and a fixing member 1830.

The fixing member 1830 according to an embodiment of the present disclosure may be formed as a spring ring. Referring to FIG. 2, the support portion 1800 according to an embodiment of the present disclosure may surround the rod body 1235 and be combined with the piston head 1231. The washer portion 1810 according to an embodiment of the present disclosure surrounds the piston rod 1230, specifically, the rod body 1235, and is combined with the piston head 1231, thereby supporting the load on the central axis of the piston rod 1230.

The fixing member 1830 according to an embodiment of the present disclosure is combined with the washer portion 1810 and spans a groove (with no reference numeral) formed along the circumference of the piston rod 1230, thereby stably fixing the washer portion 1810. Referring to FIG. 2, the driving portion 1900 according to an embodiment of the present disclosure contacts the pipe holder assembly 1250, specifically, the valve 1255, and may be installed in the spindle 1100. The driving portion 1900 may open and close the flow path of the fluid by transferring power to the valve 1255.

Referring to FIG. 2, when the user presses the driving portion 1900 to apply pressure thereto, the driving portion 1900 transmits the power to the valve 1255. The valve 1255 is pressed and moved, and therefore, the orifice 1252 which is the flow path of the fluid formed in the pipe holder body 1251 may be opened and closed, and the fluid may be moved. Referring to FIG. 2, the fluid may be moved between a plurality of chambers partitioned inside the cylinder portion 1210 through the orifice 1252, the piston rod 1230 may reciprocate inside the cylinder portion 1210, and the stroke of the hydraulic-pneumatic apparatus 1000 may be adjusted.

FIG. 11 is an enlarged view of part C of FIG. 2. The driving portion 1900 according to another embodiment of the present disclosure may be formed as a release arm, unlike the driving portion 1900 according to an embodiment that is movable in the up and down direction and transfers power to the valve 1255.

Referring to FIG. 11, the driving portion 1900 according to another embodiment of the present disclosure may contact the valve 1255 and protrude from the outside of the spindle 1100.

When an external force is applied to the driving portion 1900 by a user, etc., the driving portion 1900 presses the valve 1255 and the valve 1255 moves. When the valve 1255 moves, the orifice 1252 that is the flow path of the fluid in the pipe holder assembly 1250, specifically, the pipe holder body 1251, may be opened and closed.

According to the movement of the valve 1255, the piston rod 1230 may have an unmovable stationary mode and a movable movement mode, and in the movement mode, the piston rod 1230 may reciprocate relatively to the cylinder portion 1210. When the driving portion 1900 does not press the valve 1255 and the orifice 1252 of the pipe holder assembly 1250, specifically, the pipe holder body 1251, is closed, because the fluid may not flow, the position of the piston rod 1230 may be fixed inside the cylinder portion 1210.

Hereinafter, the hydraulic-pneumatic apparatus 1000 including the flange portion 1300 according to the second embodiment will be described with reference to FIGS. 6 to 10.

<Hydraulic-Pneumatic Apparatus Including Flange Portion According to the Second Embodiment>

Referring to FIGS. 6 to 10, the hydraulic-pneumatic apparatus 1000 according to an embodiment of the present disclosure may include the spindle 1100, the cylinder assembly 1200, the pipe holder assembly 1250, the flange portion 1300, the sealant 1400, the first ring portion 1510, a second ring portion 1550, the gas sealing member 1600, the open holder 1700, the support portion 1800, and the driving portion 1900.

In the flange portion 1300 according to the second embodiment of the present disclosure, the second groove portion 1350 having a preset depth may be formed along the outer circumferential surface of the spindle 1100 facing the inner circumferential surface, in addition to the first groove portion 1330 formed in the flange portion 1300 according to the first embodiment. Specifically, the second groove portion 1350 may be formed along the outer circumferential surface of the flange portion 1300, and formed to have the preset depth in the outer circumferential surface of the flange portion 1300 toward a direction of the central axis of the flange portion 1300.

The second ring portion 1550 may be disposed in the second groove portion 1350 formed in the outer circumferential surface of the flange portion 1300, and the diameter of the second ring portion 1550 may be formed to be relatively larger than the depth of the second groove portion 1350. Consequently, the second ring portion 1550 may protrude toward the spindle 1100, specifically, the inner circumferential surface of the bent portion 1110, facing the outer circumferential surface of the flange portion 1300 in which the second groove portion 1350 is formed while the second ring portion 1550 is seated in the second groove portion 1350.

The second ring portion 1550 is formed in a ring shape, may be formed of the same material as that of the O-ring 1253, and may be formed of an elastically deformable rubber material, a resin material, an acrylonitrile-butadiene rubber (ABR) material, a metal material, etc. The second ring portion 1550 may prevent the outflow of the fluid between the flange portion 1300 and the gas sealing member 1600.

Referring to 7 to 9A and 9B, the diameter of the second ring portion 1550 is formed to be relatively larger than that of the first ring portion 1510, but is not limited thereto, and various modifications are possible such as the diameter of the second ring portion 1550 is formed to be the same as or smaller than that of the first ring portion 1510. Referring to 7 to 10, the sealants 1400 and 1401 may be disposed between the flange portion 1300 and the spindle 1100 facing the flange portion 1300, specifically, one surface of the bent portion 1110.

The sealants 1400 and 1401 are in the liquid state and then are cured, and may block the flow path of the fluid between the spindle 1100 and the flange portion 1300 to prevent the outflow of the fluid. Referring to FIGS. 7, 8 to 9A, and 9B, the sealants 1400 and 1401 may be disposed to contact the second ring portion 1550. Specifically, the sealants 1400 and 1401 may be simultaneously disposed in contact with the second ring portion 1550, the spindle 1100, specifically, the inner circumferential surface of the bent portion 1110, and the flange portion 1300.

Referring to 7 to 9A and 9B, the sealants 1400 and 1401 simultaneously contact the second ring portion 1550, the flange portion 1300, the spindle 1100, specifically, the inner circumferential surface of the bent portion 1110, thereby blocking the outflow of the fluid such as gas through a gap formed between the flange portion 1300 and the inner circumferential surface of the bent portion 1110.

Referring to FIG. 8, the sealants 1400 and 1401 are disposed so as to contact a lower side (with reference to FIG. 8) of the second ring portion 1550, but various modifications are possible such as the sealants 1400 and 1401 are disposed so as to contact an upper side (with reference to FIG. 8) of the second ring portion 1550 as shown in FIGS. 9A and 9B, and the outflow of the fluid such as gas through the gap formed between the flange portion 1300 and the inner circumferential surface of the bent portion 1110 may be blocked.

Referring to FIGS. 7 to 9A and 9B, the sealants 1400 and 1401 may be disposed in a ring shape while contacting the inner circumferential surface of the bent portion 1110, the flange portion 1300, and the second ring portion 1550 with respect to the central axis of the spindle 1100 in the longitudinal direction, thereby effectively preventing the outflow of the fluid such as gas between the flange portion 1300 and the bent portion 1110.

Referring to FIGS. 9A and 9B, FIG. 9A in which the sealants 1400 and 1401 are disposed in an upper side of the second ring portion 1550 is different from FIG. 8 in which the sealants 1400 and 1401 are disposed in a lower side of the second ring portion 1550, and FIG. 9B in which the position of the second groove portion 1350 is spaced relatively farther apart from the step portion 1310, and the sealants 1400 and 1401 are disposed in the ring shape while contacting the flange portion 1300, the gas sealing member 1600, the inner circumferential surface of the spindle, and the second ring portion 1550 is different from FIG. 9A.

Referring to FIG. 10, the sealants 1400 and 1401 may be applied along the circumference in the ring shape between one end of the spindle 1100 facing the step portion 1310, thereby preventing the outflow of the fluid between the spindle 1100 and the flange portion 1300.

Referring to FIGS. 7 to 10, the hydraulic-pneumatic apparatus 1000 is the same as the hydraulic-pneumatic apparatus 1000 including the flange portion 1300 according to the first embodiment of the present disclosure in the configuration, the operation principle, and the effect of the spindle 1100, the assembly 1200, the sealant 1400, the first ring portion 1510, the gas sealing member 1600, the open holder 1700, the support portion 1800, and the driving portion 1900, except that the second groove portion 1350 is formed in the flange portion 1300 according to the second embodiment of the present disclosure, the second ring portion 1550 is formed in the second groove portion 1350 and contacts the inner circumferential surface of the spindle 1100, and thus a redundant description thereof will be omitted.

Figure 12:
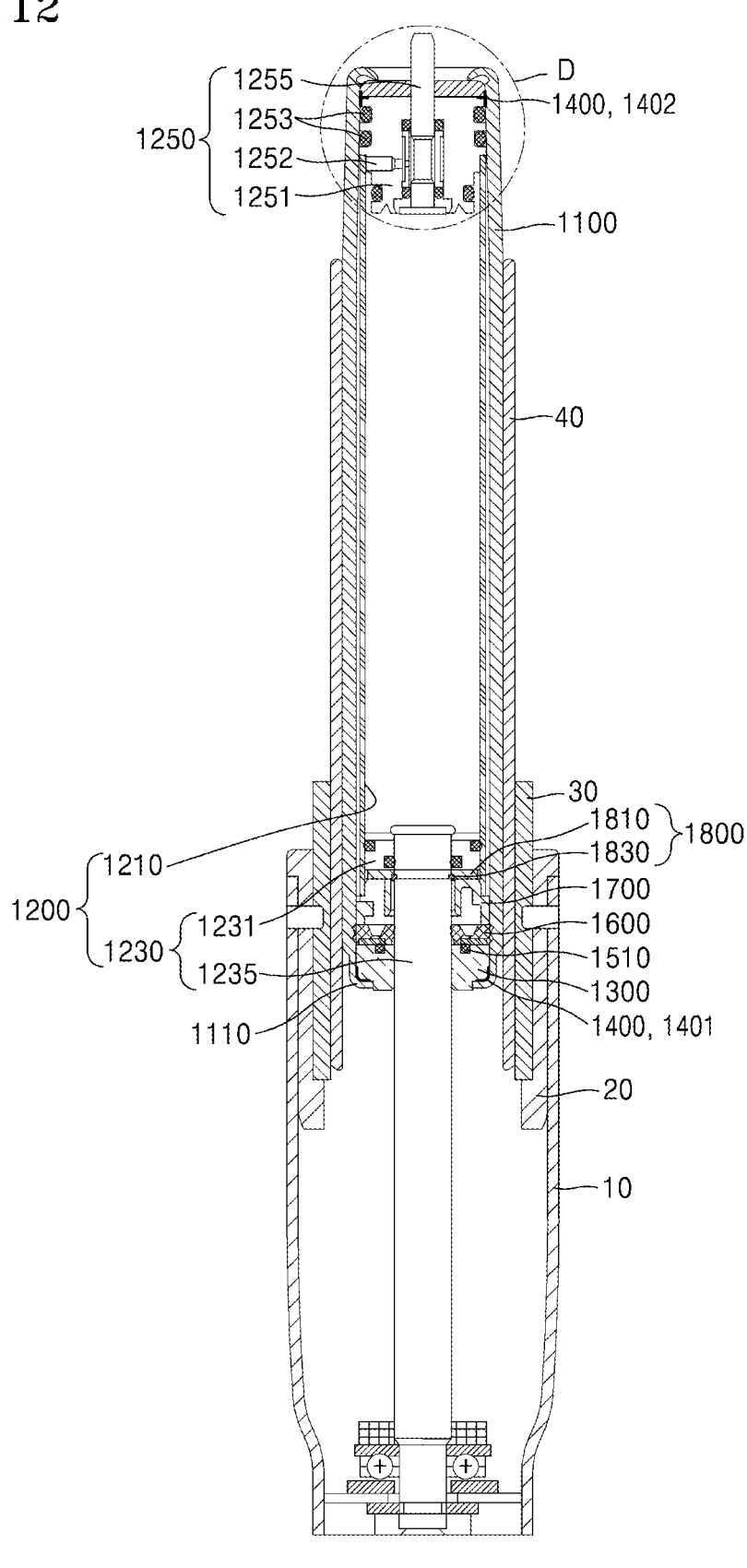
FIG. 12 is a front cross-sectional view illustrating a hydraulic-pneumatic apparatus according to another embodiment of the present disclosure.
Figure 13:
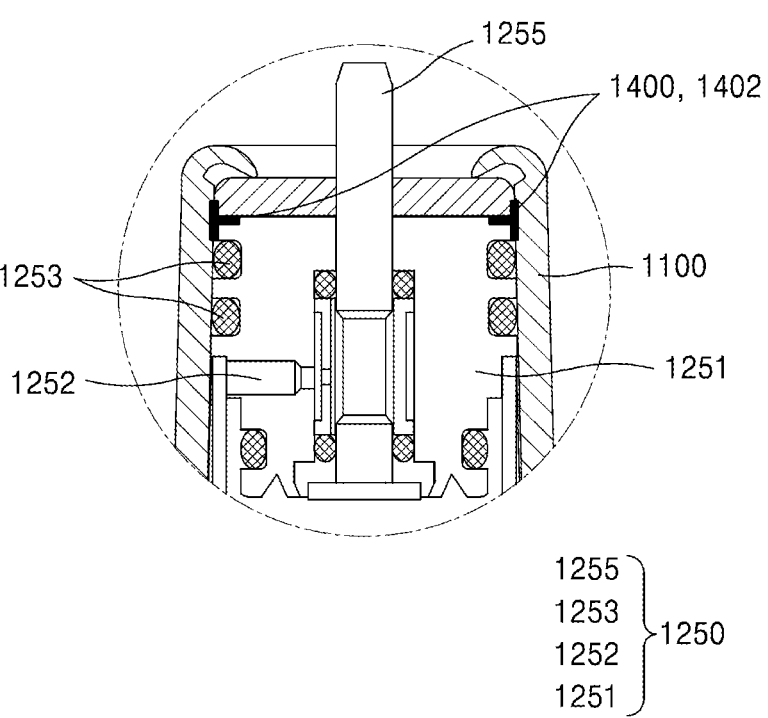
FIG. 13 is an enlarged view of part D of FIG. 12.

Hereinafter, the hydraulic-pneumatic apparatus 1000 according to another embodiment of the present disclosure will be described. FIG. 12 is a front cross-sectional view illustrating the hydraulic-pneumatic apparatus 1000 according to another embodiment of the present disclosure. FIG. 13 is an enlarged view of part D of FIG. 12.

Referring to FIGS. 12 and 13, the hydraulic-pneumatic apparatus 1000 according to another embodiment of the present disclosure may include a housing 10, a guide 20, a bushing 30, a sleeve 40, the spindle 1100, the cylinder assembly 1200, the flange portion 1300, the sealants 1400, 1401, and 1402, the first ring portion 1510, the second ring portion, the gas sealing member 1600, the open holder 1700, and the support portion 1800.

Referring to FIG. 12, the other end (a lower end with reference to FIG. 12) of the piston rod 1230 opposite to one end (an upper end with reference to FIG. 12) inserted into the cylinder assembly 1200, specifically, the spindle 1100, may be combined with and fixed to the housing 10.

Referring to FIG. 12, the housing 10 is formed with a hollow inside, and the lower end of the cylinder assembly 1200, specifically, the piston rod 1230, may be fixed thereto and combined therewith. Referring to FIG. 12, the sleeve 40 may be combined with an outer circumferential surface of the spindle 1100 according to an embodiment of the present disclosure. The sleeve 40 is formed in a hollow tubular shape, and may be formed in a shape corresponding to the shape of the outer circumferential surface of the spindle 1100.

The sleeve 40 according to an embodiment of the present disclosure may increase the stroke of the hydraulic-pneumatic apparatus 1000, and may increase the rigidity of the spindle 1100 so as to stably move together with the sleeve 40.

Referring to FIG. 12, the bushing 30 according to an embodiment of the present disclosure contacts the sleeve 40. Specifically, an inner circumferential surface of the bushing 30 may contact an outer circumferential surface of the sleeve 40. The bushing 30 provides a movement path to the sleeve 40, thereby stably supporting the sleeve 40 and the spindle 1100 combined with the sleeve 40.

Referring to FIG. 12, the guide 20 according to an embodiment of the present disclosure is combined with and fixed to an inner circumferential surface of the housing 10, and the inner circumferential surface of the guide 20 may be combined with the outer circumferential surface of the bushing 30 with a separate fastening member (with no reference numeral). The guide 20 according to an embodiment of the present disclosure may stably fix the position of the bushing 30, and provide a path so that the sleeve 40, the spindle 1100, and the cylinder portion 1210 may stably move along the central axis inside the bushing 30.

The guide 20 according to an embodiment of the present disclosure is formed of a plastic material, but is not limited thereto, and modifications of various materials are possible within the technical idea capable of stably fixing the position of the bushing 30.

Referring to FIGS. 12 and 13, in the hydraulic-pneumatic apparatus 1000 according to another embodiment of the present disclosure, the pipe holder assembly 1250, specifically, the valve 1255, may protrude from the outside of the spindle 1100, and unlike the hydraulic-pneumatic apparatus 1000 according to an embodiment of the present disclosure, the driving portion 1900 transferring power to the valve 1255 is not required.

In other words, the user may press the valve 1255 by directly applying a pressure to the valve 1255, and the pressure is applied to the valve 1255, and therefore, the orifice 1252 formed in the pipe holder body 1251 may be opened and closed.

Referring to FIG. 13, the sealants 1400 and 1402 may be applied between the pipe holder body 1251 according to an embodiment of the present disclosure and the inner circumferential surface of the spindle 1100. The sealants 1400 and 1402 may be arranged in the ring shape along the inner circumferential surface of the spindle 1100 in contact with the upper end (FIG. 13) of the pipe holder body 1251.

Consequently, the outflow of the fluid such as gas between the pipe holder body 1251 and the inner circumferential surface of the bent portion 1110 may be blocked.

The hydraulic-pneumatic apparatus 1000 according to another embodiment of the present disclosure is the same as the one embodiment of the present disclosure in the configuration, the operation principle, and the effect of the spindle 1100, the assembly 1200, the flange portion 1300, the sealants 1400, 1401, 1402, the first ring portion 1510, the second ring portion 1550 in FIG. 7, the gas sealing member 1600, the open holder 1700, and the configuration, and the support portion 1800 in FIG. 7, except that the configurations of the housing 10, the guide 20, the bushing 30, and the sleeve 40, and the configuration of the driving portion 1900 transferring power to the pipe holder assembly 1250, specifically, the valve 1255, are not required, and thus a redundant description thereof will be omitted.

In addition, the flange portion 1300 according to the first embodiment is shown in FIG. 12, but is not limited thereto, and various modifications are possible, such as the flange portion 1300 may be applied according to the second embodiment in which the second groove portion 1350 is formed so that the second ring portion 1550 may be disposed.

Figure 14:
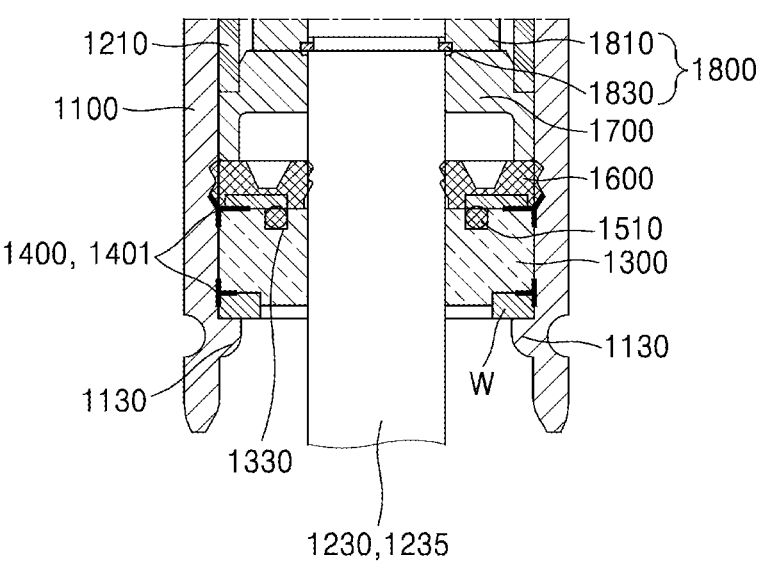
FIGS. 14 and 15 are partially enlarged views showing a hydraulic-pneumatic apparatus according to another embodiment of the present disclosure.
Figure 15:
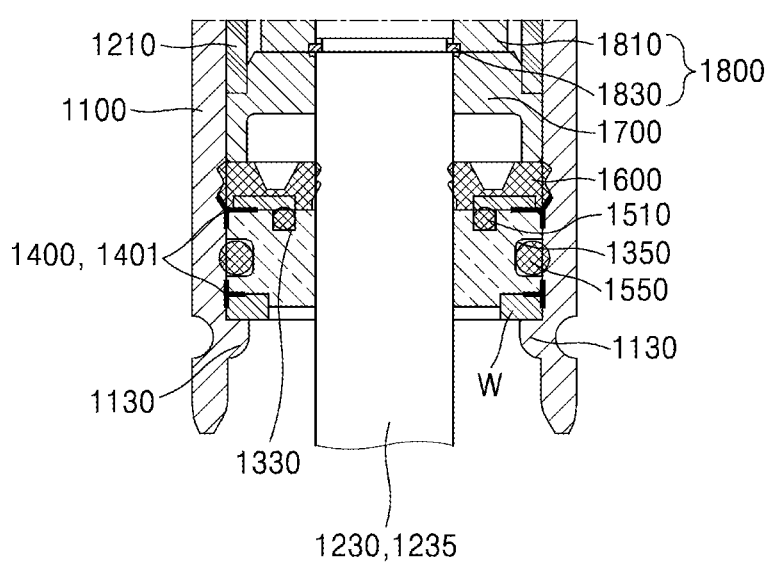

Hereinafter, a hydraulic-pneumatic apparatus according to another embodiment of the present disclosure will be described. FIGS. 14 and 15 are partially enlarged views showing a hydraulic-pneumatic apparatus according to another embodiment of the present disclosure. Referring to FIGS. 14 and 15, the hydraulic-pneumatic apparatus may include the spindle 1100, the cylinder assembly 1200, the flange portion 1300, the sealant 1400, the first ring portion 1510, the second ring portion 1550, the gas sealing member 1600, the open holder 1700, the support portion 1800, and a driving portion.

FIGS. 14 and 15 are partially enlarged views of regions in which the flange portion 1300 is installed in the hydraulic-pneumatic apparatus 1000. Specifically, FIG. 14 corresponds to region A in which the flange portion 1300 according to the first embodiment in FIG. 2 is installed, and FIG. 15 corresponds to region B in which the flange portion 1300 according to the second embodiment in FIG. 7 is installed.

Also, FIG. 15 corresponds to a lower end region of the spindle 1100 in which the flange portion 1300 is installed in FIG. 12. Referring to FIG. 14, the spindle 1100 is formed with a hollow inside, and a protrusion portion 1130 may be formed to protrude toward the central axis of the spindle 1100 in the longitudinal direction on the inlet of the spindle 1100.

Specifically, the flange portion 1300 with which the cylinder assembly 1200, the open holder 1700, the gas sealing member 1600, and the first ring portion 1510 are combined may be inserted into the spindle 1100, and the protrusion portion 1130 may be formed to protrude toward the central axis of the spindle 1100 in the longitudinal direction on the inner circumferential surface of the spindle 1100 on the outside of the flange portion 1300, specifically, on the lower side (with reference to FIG. 14).

Referring to FIG. 14, the sealants 1400 and 1401 may be disposed between the inner circumferential surface of the spindle 1100 on which the protrusion portion 1130 is formed and the flange portion 1300. Referring to FIG. 14, the protrusion portion 1130 according to an embodiment of the present disclosure is disposed on a movement path of the flange portion 1300, thereby preventing the flange portion 1300 inserted into the spindle 1100 from being separated.

Furthermore, the sealants 1400 and 1401 are disposed between the inner circumferential surface of a lower region (with reference to FIG. 14) of the spindle 1100 in which the protrusion portion 1130 is formed and the flange portion 1300, thereby blocking the outflow of the fluid.

Referring to FIG. 14, the washer W may be disposed between the protrusion portion 1130 formed on the spindle 1100 and the flange portion 1300. In this regard, the sealants 1400 and 1401 may be disposed to simultaneously contact the inner circumferential surface of the spindle 1100, the flange portion 1300, and the washer W.

Referring to FIGS. 14 and 15, the protrusion portion 1130 protruding from the inner circumferential surface of the spindle 1100 may be formed to protrude toward the piston rod 1230 from the inner circumferential surface of the spindle 1100 by pushing, in a direction of the central axis, a predefined region of the outer circumferential surface of the spindle 1100 extending in an up and down direction (with reference to FIG. 14).

However, the present disclosure is not limited thereto, and various modifications are possible, such as the protrusion portion 1130 are integrally combined to protrude toward the piston rod 1230 along the inner circumferential surface of the spindle 1100 extending in the up and down direction (with reference to FIG. 14).

FIG. 15 is the same as FIG. 14 in which the flange portion 1300 according to the first embodiment is installed in the configuration of the protrusion portion 1103 formed to protrude toward the central axis of the spindle in the longitudinal direction on the inlet of the spindle 1100, except that the flange portion 1300 according to the second embodiment is disposed on the inside of the spindle 1100, and thus a detailed description thereof in the overlapping range will be omitted.

FIGS. 14 and 15 are the same as FIGS. 1 to 13 in the other configuration, the operation principle, and the effect of the hydraulic-pneumatic apparatus 1000, except that the protrusion portion 1103 is formed to protrude, instead of the bent portion 1110 being formed on the spindle 1100, and the sealants 1400 and 1401 are disposed between the inner circumferential surface of the flange portion 1300 on which the protrusion portion 1130 is formed and the outer circumferential surface of the flange portion 1300 as in FIGS. 2, 7 and 12, and thus, detailed descriptions thereof in the overlapping range will be omitted.

Figure 16:
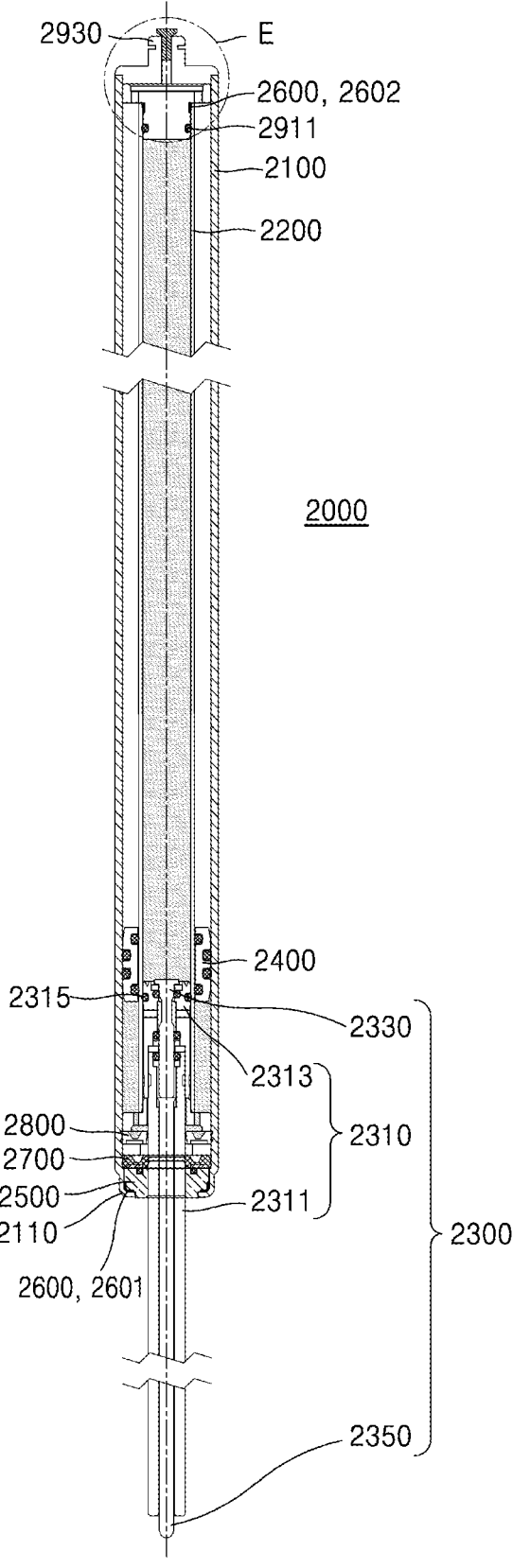
FIG. 16 is a front cross-sectional view illustrating a flange portion according to another embodiment of the present disclosure.
Figure 17:
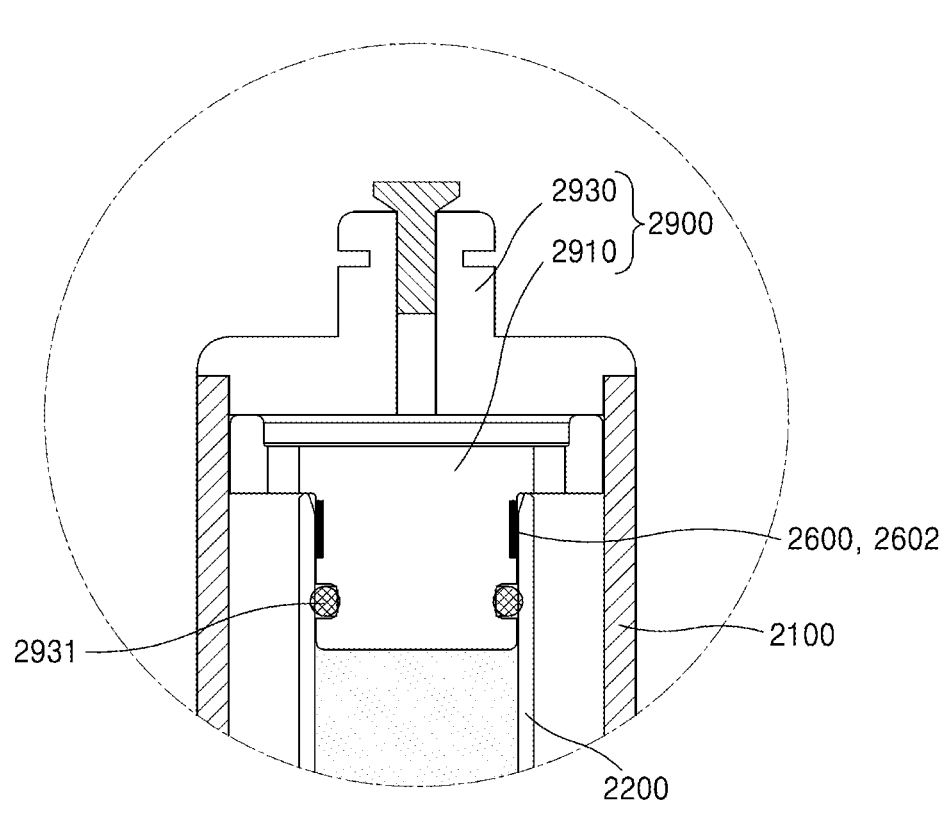
FIG. 17 is an enlarged view of part E of FIG. 16.

Hereinafter, a hydraulic-pneumatic apparatus 2000 according to another embodiment of the present disclosure will be described. FIG. 16 is a front cross-sectional view illustrating a hydraulic-pneumatic apparatus according to another embodiment of the present disclosure. FIG. 17 is an enlarged view of part E of FIG. 16.

Referring to FIGS. 16 and 17, the hydraulic-pneumatic apparatus 2000 according to another embodiment of the present disclosure is the gas spring type hydraulic-pneumatic apparatus 2000 different from the gas cylinder type hydraulic-pneumatic apparatus 1000 shown in FIGS. 2, 7 and 12.

Referring to FIGS. 16 and 17, the hydraulic-pneumatic apparatus 2000 according to another embodiment of the present disclosure may include an outer cylinder 2100, an inner cylinder 2200, a piston assembly 2300, a free piston 2400, a flange portion 2500, sealants 2600, 2601, and 2602, a gas sealing member 2700, an open holder 2800, and a cap portion 2900. Referring to FIG. 16, the outer cylinder 2100 is formed in a hollow tube, and may provide space accommodating an internal mechanic component, a compressed gas such as nitrogen, or a fluid such as a liquid, for example, oil.

Referring to FIG. 16, the cap portion 2900 which will be described below, specifically, an outer cap 2930, may be inserted into one end (an upper end with reference to FIG. 16) of the outer cylinder 2100 so that the outer cylinder 2100 may be covered. The inner cylinder 2200 shares a central axis with the outer cylinder 2100, and may be disposed inside the outer cylinder 2100.

Referring to FIG. 16, the cap portion 2900, specifically, an inner cap 2910, may be inserted into one end (an upper end with reference to FIG. 16) of the inner cylinder 2200 so that the inner cylinder 2200 may be covered. A part of the inner cap 2910 may be inserted into one end (the upper end with reference to FIG. 16) of the inner cylinder 2200.

Referring to FIGS. 16 and 17, the inner cap 2910 may include an O-ring 2911 for sealing to be frictionally combined with the inner cylinder 2200. Accordingly, one end (the upper end with reference to FIG. 16) of the inner cylinder 2200 may be sealed so that the fluid accommodated in the inner cylinder 2200 does not escape to the outside.

Referring to FIG. 17, the sealants 2600 and 2602 may be applied between an inner circumferential surface of the inner cylinder 2200 and an outer circumferential surface of the inner cap 2910, in addition to the O-ring 2911.

The sealants 2600 and 2602 are disposed between the inner cap 2910 and the inner circumferential surface of the inner cylinder 2200, and in the liquid state and then are cured, thereby blocking the outflow of the fluid accommodated in the inner cylinder 2200 in addition to the O-ring 2911.

Referring to FIG. 16, the piston assembly 2300 is inserted into the inner cylinder 2200, and may include a piston rod 2310 and a piston valve 2330.

Referring to FIG. 16, the other end (the lower end with reference to FIG. 16) of the inner cylinder 2200 opposite to one end into which the inner cap 2910 is inserted is opened, and the piston rod 2310 may be inserted into the opened inner cylinder 2200 to relatively reciprocate on the inside of the inner cylinder 2200. Referring to FIG. 16, the piston rod 2310 may include a rod body 2311, a piston head 2313, and an O-ring 2315.

The rod body 2311 is formed extending along the central axis of the outer cylinder 2100 and the inner cylinder 2200 and is inserted into the inner cylinder 2200, and the piston head 2313 is connected to the rod body 2311 and touches the inner circumferential surface of the inner cylinder 2200.

The O-ring 2315 may be combined with the piston head 2313, thereby preventing the fluid from flowing into space formed between the piston head 2313 and the inner circumferential surface of the inner cylinder 2200. Referring to FIG. 16, the piston valve 2330 is combined with the piston rod 2310, specifically, the piston head 2313, opens and closes a flow path that is a flow path of the fluid between the outer cylinder 2100 and the inner cylinder 2200, and may be connected to the driving portion 2350 which will be described below.

The driving portion 2350 is disposed in the center of the piston rod 2310, may be connected to the piston valve 2330, and when a user, etc. applies a pressure to the driving portion 2350 from the outside, the piston valve 2330 moves to open and close the flow path of the fluid, which enables entry and exit of the fluid.

According to the opening or closing of the piston valve 2330, the piston rod 2310 has an unmovable stationary mode and a movable movement mode In the movement mode, the piston rod 2310 may reciprocate relatively to the inner cylinder 2200.

Referring to FIG. 16, the free piston 2400 is disposed in the space between the outer cylinder 2100 and the inner cylinder 2200, partitions the space between the outer cylinder 2100 and the inner cylinder 2200, and is movable in contact with each of the inner circumferential surface of the cylinder 2100 and the outer circumferential surface of the inner cylinder 2200.

The free piston 2400 may include an O-ring (with no reference numeral) touching the outer cylinder 2100 and an O-ring (with no reference numeral) touching the inner cylinder 2200.

The O-ring may block the fluid from flowing through a gap between the free piston 2400 and the outer cylinder 2100 and between the free piston 2400 and the inner cylinder 2200. The volume of each of a plurality of spaces partitioned between the outer cylinder 2100 and the inner cylinder 2200 may be changed according to the pressure applied to the free piston 2400, and the stroke of the hydraulic-pneumatic apparatus 2000 may be adjusted.

Referring to FIG. 16, in the hydraulic-pneumatic apparatus 2000 according to another embodiment of the present disclosure, the flange portion 2500 surrounds the piston rod 2310 and is disposed on the inlet side of the external cylinder 2100, and may contact the inner circumferential surface of the external cylinder 2100.

A bent portion 2110 that is bent to surround the flange portion 2500 may be formed in one end (a lower end with reference to FIG. 16) of the outer cylinder 2100, which may correspond to the bent portion 1110 formed in the spindle 1100 of the hydraulic-pneumatic apparatus 2000 according to an embodiment.

That is, the sealants 2600 and 2601 may be disposed between the flange portion 2500 and one surface of the bent portion 2110 facing the flange portion 2500.

The flange portion 2500 of the hydraulic-pneumatic apparatus 2000 according to another embodiment of the present disclosure is the same as the flange portion 1300 according to the first and second embodiments applied to the gas cylinder type hydraulic-pneumatic apparatus 1000 in the configuration, the operation principle and the effect, except that the flange portion 2500 is applied to the gas spring type hydraulic-pneumatic apparatus 2000, and the sealants 2600 and 2601 may also be arranged between the flange portion 2500 and the outer cylinder 2100 in the same way as the sealants 1400 and 1401 of the hydraulic-pneumatic apparatus 1000 according to an embodiment of the present disclosure.

In addition, the gas sealing member 2700 and the open holder 2800 of the hydraulic-pneumatic apparatus 2000 according to another embodiment of the present disclosure are the same as the gas sealing member 1600 and the open holder 1700 of the hydraulic-pneumatic apparatus 1000 according to an embodiment of the present disclosure, respectively, and thus, detailed descriptions related thereto will be omitted.

In addition, although not shown in the drawings, in the spindle 2100 of the hydraulic-pneumatic apparatus 2000 according to another embodiment of the present disclosure, instead of the bent portion 2110, a protrusion portion may be formed to protrude toward the central axis of the spindle 2100 in the longitudinal direction on the inlet of the spindle 2100 in which the flange portion 2500 is disposed, and the sealants 2600 and 2601 may be disposed between the inner circumferential surface of the spindle 2100 on which the protrusion portion is formed and the outer circumferential surface of the flange portion 2500 as shown in FIGS. 14 and 15, and a detailed description related thereto will be omitted as described above.

The specific implementations described in the present disclosure are embodiments and do not limit the scope of the present disclosure in any way. For the sake of brief specification, description of electronic configurations, control systems, software, and other functional aspects of the systems of the related art may be omitted. In addition, connections or connection members of lines between components illustrated in the drawings exemplarily represent functional connections and/or physical connections or circuit connections, and may be represented as various functional connections, physical connections, or circuit connections that may be replaced or added in an actual apparatus. In addition, if there is no specific mention such as "essential" or "important", the component may not be indispensable for application of the present disclosure.

Accordingly, the idea of the present disclosure is limited to the above-described embodiments, and not only the claims which will be described below, but also all scopes equivalent to or equivalently changed from the claims are within the scope of the idea of the present disclosure.

INDUSTRIAL APPLICABILITY

The present disclosure relates to a hydraulic-pneumatic apparatus, and the embodiments of the present disclosure may be applied to an industrially used table, a work table, a dining table or a desk and a chair with an adjustable height.

The invention claimed is:

1. A hydraulic-pneumatic apparatus comprising:
a cylinder assembly including:
   a spindle with a hollow inside;
   a hollow cylinder portion; and
   a piston rod capable of reciprocating inside the hollow cylinder portion, and inserted through an inlet of the spindle;
a flange portion surrounding the piston rod, disposed on an inlet side of the hollow cylinder portion, and contacting an inner circumferential surface of the spindle, wherein:
   a bent portion is formed at the inlet of the spindle to surround and bend the flange portion;
   the flange portion forms a step portion having different diameters along a central axis of the piston rod in a longitudinal direction; and
   in one surface of the flange portion, a first groove portion having a preset depth is formed parallel to the central axis of the piston rod along an outer surface of the flange portion;
a first ring portion formed in a ring shape and disposed in the first groove portion, wherein the first ring portion is formed of a rubber material or a resin material; and a sealant disposed between an outer circumferential sur-face of the step portion formed on the flange portion and an end of the bent portion facing the piston rod, wherein:

the sealant is in a liquid state, a semi-liquid state, or a solid state, and then is cured; and the sealant is disposed on an inner circumferential surface of the bent portion.

2. The hydraulic-pneumatic apparatus of claim 1, wherein a second groove portion having a preset depth is formed in the flange portion along the outer circumferential surface facing the inner circumferential surface of the spindle, the hydraulic-pneumatic apparatus further comprising: a second ring portion disposed in the second groove portion and contacting the inner circumferential surface of the spindle.

3. The hydraulic-pneumatic apparatus of claim 2, wherein the second ring portion is formed of the rubber material or the resin material.

4. The hydraulic-pneumatic apparatus of claim 1, further comprising: a gas sealing member surrounding the piston rod and disposed between the flange portion and the hollow cylinder portion.

5. The hydraulic-pneumatic apparatus of claim 4, further comprising: an open holder surrounding the piston rod, disposed between the gas sealing member and the hollow cylinder portion, and covering the hollow cylinder portion.

6. The hydraulic-pneumatic apparatus of claim 5, further comprising: a support portion surrounding and combined with the piston rod and supporting a load of the piston rod.

7. The hydraulic-pneumatic apparatus of claim 1, wherein the hollow cylinder assembly further comprises a pipe holder assembly comprising a valve disposed on the other side opposite to one side of the spindle on which the flange portion is disposed, combined with one end of the hollow cylinder portion, and opening and closing a flow path of a fluid.

8. The hydraulic-pneumatic apparatus of claim 7, further comprising: a driving portion in contact with the valve, installed in the spindle, and transferring power to the valve to open and close the flow path of the fluid.

\* \* \* \* \*